(12) United States Patent
Gill et al.

(10) Patent No.: US 12,438,698 B2
(45) Date of Patent: Oct. 7, 2025

(54) MANAGING ENCRYPTION KEYS OF SECURE TUNNELS IN MULTI-TENANT EDGE DEVICES

(71) Applicant: Cisco Technology, Inc., San Jose, CA (US)

(72) Inventors: Ajeet Pal Singh Gill, Fremont, CA (US); Srilatha Tangirala, San Jose, CA (US)

(73) Assignee: Cisco Technology, Inc., San Jose, CA (US)

(\*) Notice: Subject to any disclaimer, the term of this patent is extended or adjusted under 35 U.S.C. 154(b) by 173 days.

(21) Appl. No.: 18/360,338

(22) Filed: Jul. 27, 2023

(65) Prior Publication Data
US 2025/0038957 A1 Jan. 30, 2025

(51) Int. Cl.
*H04L 9/08* (2006.01)
*H04L 9/14* (2006.01)
*H04L 9/40* (2022.01)

(52) U.S. Cl.
CPC .......... *H04L 9/0819* (2013.01); *H04L 9/0861* (2013.01); *H04L 9/14* (2013.01); *H04L 63/029* (2013.01)

(58) Field of Classification Search
CPC ....... H04L 9/0819; H04L 9/0861; H04L 9/14; H04L 63/029; H04L 63/0272
See application file for complete search history.

(56) References Cited

U.S. PATENT DOCUMENTS

| | | | |
|---|---|---|---|
| 10,826,775 B1 * | 11/2020 | Moreno | H04L 45/64 |
| 11,323,363 B1 * | 5/2022 | Sanchez | H04L 69/165 |
| 2012/0237033 A1 | 9/2012 | Tanaka et al. | |
| 2014/0283010 A1 | 9/2014 | Rutkowski et al. | |
| 2018/0062835 A1 * | 3/2018 | Hamel | H04L 9/0822 |
| 2018/0109493 A1 * | 4/2018 | Khan | H04L 63/0209 |
| 2018/0316495 A1 * | 11/2018 | Wall | H04L 9/3073 |
| 2019/0140826 A1 * | 5/2019 | Carrel | H04L 9/0827 |
| 2019/0140955 A1 * | 5/2019 | Hemige | H04L 47/125 |
| 2019/0296896 A1 * | 9/2019 | Resch | H04L 9/0656 |
| 2019/0303951 A1 * | 10/2019 | Bakalis | G06K 7/10722 |
| 2019/0356475 A1 * | 11/2019 | Resch | H04L 9/085 |

(Continued)

FOREIGN PATENT DOCUMENTS

CN  113169930 A  *  7/2021  ......... H04L 12/4633

*Primary Examiner* — John B King
(74) *Attorney, Agent, or Firm* — Polsinelli P.C.

(57) ABSTRACT

Disclosed are systems, apparatuses, methods, computer readable medium, and circuits for managing encryption keys in a multi-tenant network edge device. According to at least one example, a method includes: receiving tenant resource information at the multi-tenant network edge device; generating at least one parent encryption key; generating a plurality of child encryption keys; creating a routing connection to a network controller for each tenant in the plurality of tenants; transmitting the at least one parent encryption key and the plurality of child encryption keys to the network controller for distribution to the plurality of tenants; receiving a plurality of advertisements of transport locators from the network controller, wherein each advertisement includes a parent encryption key or a child encryption key; selecting a set of encryption keys from the plurality of advertisements; and forming a secure tunnel.

20 Claims, 9 Drawing Sheets

(56) References Cited

U.S. PATENT DOCUMENTS

| | | | |
|---|---|---|---|
| 2020/0092094 A1* | 3/2020 | Resch | H04L 9/0877 |
| 2020/0127983 A1 | 4/2020 | Asghar et al. | |
| 2020/0169390 A1* | 5/2020 | Raza | H04L 9/0861 |
| 2020/0177503 A1* | 6/2020 | Hooda | H04L 12/4641 |
| 2020/0177550 A1* | 6/2020 | Valluri | H04L 45/02 |
| 2020/0177606 A1* | 6/2020 | Valluri | H04L 63/0227 |
| 2020/0322230 A1* | 10/2020 | Natal | G06F 9/45558 |
| 2020/0403821 A1* | 12/2020 | Dev | H04L 45/58 |
| 2021/0044565 A1* | 2/2021 | Moreno | H04L 63/0272 |
| 2021/0099360 A1 | 4/2021 | Parsons et al. | |
| 2021/0112034 A1* | 4/2021 | Sundararajan | H04L 47/125 |
| 2021/0258268 A1 | 8/2021 | Yu et al. | |
| 2022/0052947 A1* | 2/2022 | Baruah | H04L 12/4633 |
| 2022/0239507 A1 | 7/2022 | Smith et al. | |
| 2022/0329540 A1* | 10/2022 | Tangirala | H04L 45/02 |
| 2022/0417332 A1* | 12/2022 | Chiganmi | H04L 67/141 |
| 2023/0030403 A1* | 2/2023 | Jeuk | G06F 21/606 |
| 2023/0409597 A1* | 12/2023 | Kashi Visvanathan | G06F 21/6218 |
| 2024/0340687 A1* | 10/2024 | Shen | H04W 28/0268 |

* cited by examiner

300

MANAGING ENCRYPTION KEYS OF SECURE TUNNELS IN MULTI-TENANT EDGE DEVICES

TECHNICAL FIELD

The disclosure relates generally to communication networks and, more specifically but not exclusively, to multi-tenant edge devices and methods for managing encryption keys of secure tunnels in multi-tenant edge devices.

DESCRIPTION OF THE RELATED TECHNOLOGY

The present disclosure relates generally to assigning tenants to a virtual controller for software defined networking functions, and, more particularly, to providing tenants fairness in a multi-tenant network where tenants are permitted to utilize more than their guaranteed quantity of resources.

BRIEF DESCRIPTION OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
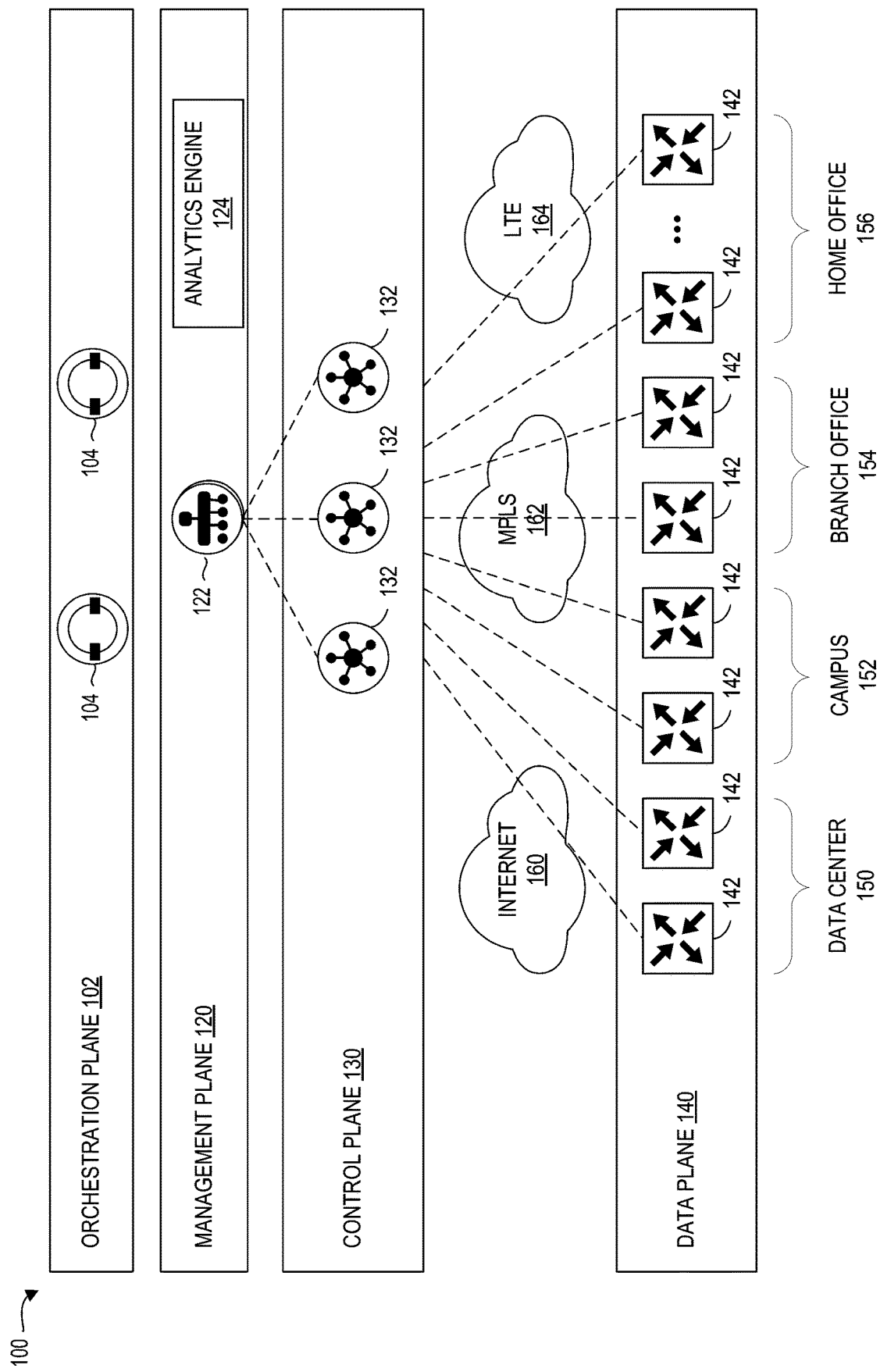
FIG. 1 illustrates an example of a high-level network architecture in accordance with an embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims or may be learned by the practice of the principles set forth herein.

Overview

In a multi-tenant network configuration, each network device can be configured to share resources. However, it is important to guarantee resources so that a large-scale tenant does not take precedence over a small-scale or medium-scale tenant. The large-scale tenant's needs must be balanced to ensure that their network is properly functioning while also ensuring that network hardware in the multi-tenant service provider is efficiently utilized. Accordingly, equitable allocation of resources to each tenant is further described below.

Disclosed are systems, apparatuses, methods, computer readable medium, and circuits for managing encryption keys. According to at least one example, a method includes: receiving tenant resource information at the multi-tenant network edge device, wherein the multi-tenant network edge device is configured to send and receive network data for a plurality of tenants, and wherein the tenant resource information includes at least one network transport interface for a first tenant; generating at least one parent encryption key based on a number of network interfaces supported by the plurality of tenants; generating a plurality of child encryption keys, wherein at least one child encryption key is generated for each tenant in the plurality of tenants; creating a connection to a network controller for each tenant in the plurality of tenants; transmitting the at least one parent encryption key and the plurality of child encryption keys to the network controller for distribution to the plurality of tenants; receiving a plurality of advertisements of transport locators from the network controller, wherein each advertisement includes a parent encryption key or a child encryption key; selecting a set of encryption keys from the plurality of advertisements; and forming a secure tunnel with each tenant of the plurality of tenants using child encryption keys included in the set of encryption keys. For example, the multi-tenant network edge device receives tenant resource information at the multi-tenant network edge device, wherein the multi-tenant network edge device is configured to send and receive network data for a plurality of tenants, and wherein the tenant resource information includes at least one network transport interface for a first tenant; generates at least one parent encryption key based on a number of network interfaces supported by the plurality of tenants; generates a plurality of child encryption keys, wherein at least one child encryption key is generated for each tenant in the plurality of tenants; creates a connection to a network controller for each tenant in the plurality of tenants; transmits the at least one parent encryption key and the plurality of child encryption keys to the network controller for distribution to the plurality of tenants; receives a plurality of advertisements of transport locators from the network controller, wherein each advertisement includes a parent encryption key or a child encryption key; selects a set of encryption keys from the plurality of advertisements; and forms a secure tunnel with each tenant of the plurality of tenants using child encryption keys included in the set of encryption keys.

In another example, a multi-tenant network edge device for managing encryption keys is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the multi-tenant network edge device to: receive tenant resource information at the multi-tenant network edge device, wherein the multi-tenant network edge device is configured to send and receive network data for a plurality of tenants, and wherein the tenant resource information includes at least one network transport interface for a first tenant; generate at least one parent encryption key based on a number of network interfaces supported by the plurality of tenants; generate a plurality of child encryption keys, wherein at least one child encryption key is generated for each tenant in the plurality of tenants; create a routing connection to a network controller for each tenant in the plurality of tenants; transmit the at least one parent encryption key and the plurality of child encryption keys to the network controller for distribution to the plurality of tenants; receive a plurality of advertisements of transport locators from the network controller, wherein each advertisement includes a parent encryption key or a child encryption key; select a set of encryption keys from the plurality of advertisements; and form a secure tunnel with each tenant of the plurality of tenants using child encryption keys included in the set of encryption keys.

Example Embodiments

In a multi-tenant environment, multiple entities (e.g., organizations, customers, clients, etc.) may be using the same physical or virtual infrastructure, such as a cloud service provider's network or a data center. Each tenant has its own set of resources and isolated environment, and the multi-tenant environment should keep data and communications from each entity separate and secure. A transport locator isolates data and communications by providing a mechanism to identify and route traffic associated with a specific tenant. A transport locator includes a unique identifier or tag that is assigned to each tenant's network traffic. This identifier can be embedded in the packet headers or encapsulated within the transport layer protocols. In some aspects, when a packet arrives at the tenant edge device, the transport locator examines the identifier or tag to determine the corresponding tenant it belongs to. Based on this information, the device can make decisions regarding forwarding, security policies, QoS, or any other tenant-specific requirements.

WAN links in a multi-tenant edge device may use IPsec for encryption and authentication functions. Two methods of security key generation are supported including a security key per interface, such as per transport locator, and security keys per pair-wise tunnel. In some cases, a key per tenant interface using loopback interfaces may also be possible.

Aspects of the disclosure relate to configuring a network controller to advertise parent keys and child keys. The parent keys are for multi-tenant edge device communication, such as across a WAN, and the child keys are distributed to single-tenant edge devices. In this configuration, each single-tenant edge device is configured with an encryption key, and there is no sharing of encryption resources. A disclosed method generates and exchanges the per tenant keys per transport interface and requires fewer keys/interfaces as compared to the other methods. The disclosed method provides a separate key to each tenant and requires a number of keys based on number of interfaces and number of tenants, as opposed to requiring keys based on the number of tunnels. As a result, the multi-tenant edge device can manage the encryption keys without additional overhead required by a large number of encryption keys FIG. 1 illustrates an example of a network architecture 100 for implementing aspects of the present technology. An example of an implementation of the network architecture 100 is the Cisco® software-defined wide area network (SD-WAN) architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for the central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, a multiple label switching (MPLS) network 162, a mobile network 164 such as an LTE/5G network) in an underlay and overlay network in connection with an analytics engine 124. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network devices 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the various edges network environments of an organization, such as in one or more data centers 150 or colocation centers, campus networks 152, branch office networks 154, home office networks 156, and so forth, or in the cloud (e.g., Infrastructure as a Service (IaaS), Platform as a Service (PaaS), software as a service (SaaS), and other cloud service provider networks). The edge network devices 142 can provide secure data plane connectivity among sites over one or more wide area network (WAN) transports, such as via one or more Internet transport networks 160 (e.g., Digital Subscriber Line (DSL), cable, etc.), MPLS network 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
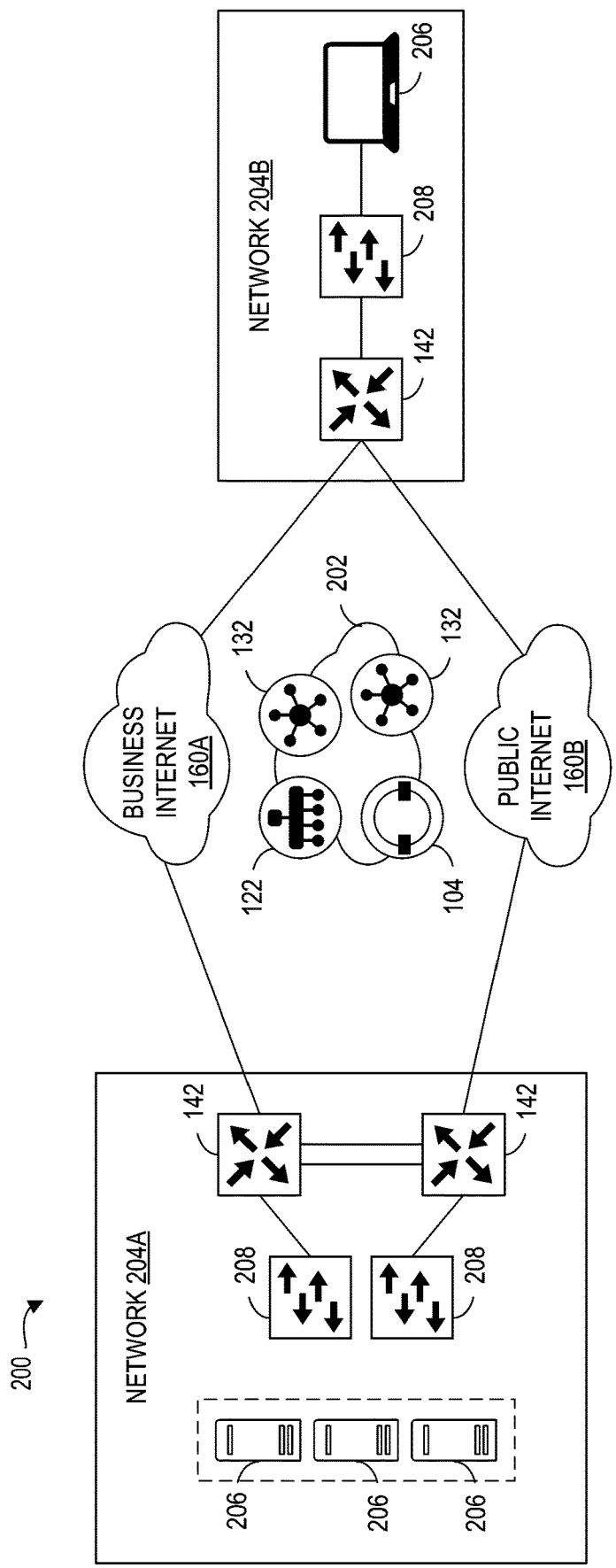
FIG. 2 illustrates an example of a network topology in accordance with an embodiment.

FIG. 2 illustrates an example of a network topology 200 for showing various aspects of the network architecture 100. The network topology 200 can include a management network 202, a pair of network sites 204A and 204B (collectively, 204) (e.g., the data center 150, the campus network 152, the branch office network 154, the home office network(s) 156, cloud service provider network(s), etc.), and a pair of Internet transport networks 160A and 160B (collectively, 160). The management network 202 can include one or more network orchestrator appliances 104, one or more network management appliances 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208, which may also be referred to as an edge device, a network edge device, etc. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), car devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the network site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., MPLS, private1, biz-internet, metro-ethernet, LTE, etc.). In this example, the network topology 200 can utilize a color called "biz-internet" for the Internet transport network 160A and a color called "public-internet" for the Internet transport network 160B.

In some embodiments, each site network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used to help identify or distinguish an individual WAN transport tunnel (e.g., no same color may be used twice on a single edge network device). Colors by themselves can also have significance. For example, the colors metro-ethernet, MPLS, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3G, biz, internet, blue, bronze, custom1, custom2, custom3, default, gold, green, LTE, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
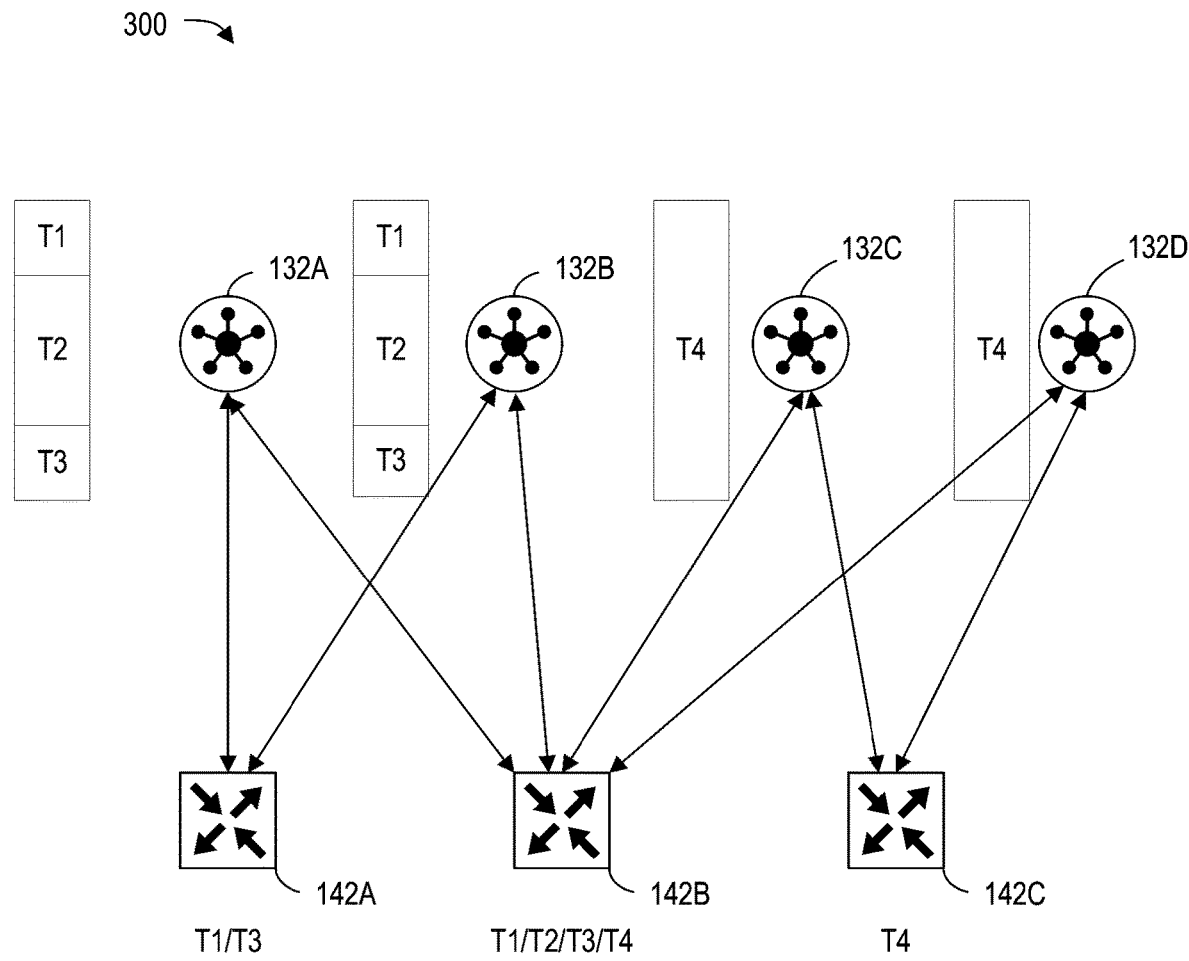
FIG. 3 illustrates an example of a multi-tenant environment 300 in accordance with some aspects of the disclosure.

FIG. 3 illustrates an example of a multi-tenant environment 300 in accordance with some aspects of the disclosure. Resources of network controller 132A are allocated to tenants T1, T2, and T3. Resources of network controller 132B are allocated to tenants T1, T2, and T3. Resources of network controller 132C and network controller 132D are allocated to tenant T4. Each of the tenants T1, T2, T3, and T4 can be connected to one or more of network controller 132A, network controller 132B, network controller 132C, and network controller 132D. Network controllers, for example, 132A, 132B, 132C, and 132D can be located across geographical regions to protect site failure and provide redundancy.

In some embodiments, each edge network device is connected to one or more network controllers for load balancing and high availability. For example, the edge network device 142A is connected to network controller 132A and network controller 132B. The edge network device 142B is connected to network controller 132A, network controller 132B, network controller 132C, and network controller 132D. The edge network device 142C is connected to network controller 132C and network controller 132D. If one controller fails, an edge network device can remain connected to a remaining network controller.

In a multi-tenant environment, multiple entities (e.g., organizations, customers, clients, etc.) may be using the same physical or virtual infrastructure, such as a cloud service provider's network or a data center. Each tenant has its own set of resources and isolated environment, and the multi-tenant environment should keep data and communications from each entity separate and secure. A transport locator isolates data and communications by providing a mechanism to identify and route traffic associated with a specific tenant. A transport locator includes a unique identifier or tag that is assigned to each tenant's network traffic. This identifier can be embedded in the packet headers or encapsulated within the transport layer protocols. In some aspects, when a packet arrives at the tenant edge device, the transport locator examines the identifier or tag to determine the corresponding tenant it belongs to. Based on this information, the device can make decisions regarding forwarding, security policies, QoS, or any other tenant-specific requirements.

WAN links in a multi-tenant edge device may use IPsec for encryption and authentication functions. Two methods of security key generation are supported including a security key per interface, such as per transport locator, and security keys per pair-wise tunnel. In some cases, a key per tenant interfaces using loopback interfaces may also be possible.

Figure 4A:
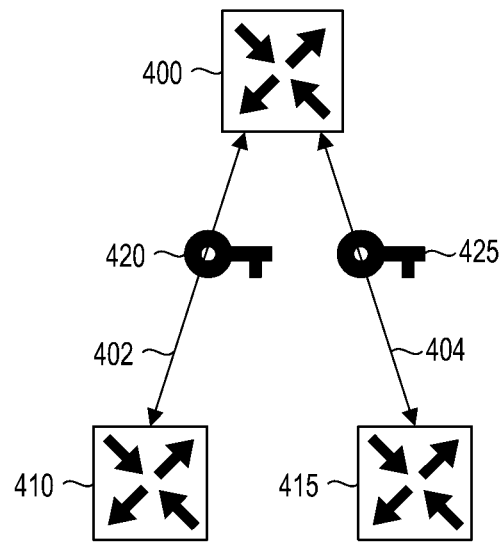
FIG. 4A is a conceptual illustration of a multi-tenant edge device 400 that uses a security key per interface.

FIG. 4A is a conceptual illustration of a multi-tenant edge device 400 that uses a security key per interface. In this case, the multi-tenant edge device 400 configures a single encryption key per transport interface, or per transport locator.

In this case, the multi-tenant edge device 400 comprises a first single-tenant edge device 410 associated with a first entity connected on a first interface 402 and a second single-tenant edge device 415 associated with a second entity and connected on a second interface 404. The first interface 402 and the second interface 404 are each associated with a single key. For example, all tunnels associated with the first interface 402 encrypt communication with key 420, and all tunnels associated with the second interface 404 encrypt communication with key 425.

In the case of one transport per multi-tenant edge device, the same key is shared among all tenants. Sharing a key among all tenants may be unacceptable to clients due to potential security risks because, particularly in the case of symmetric key encryption, a malicious actor may be able to decrypt traffic of another entity.

Figure 4B:
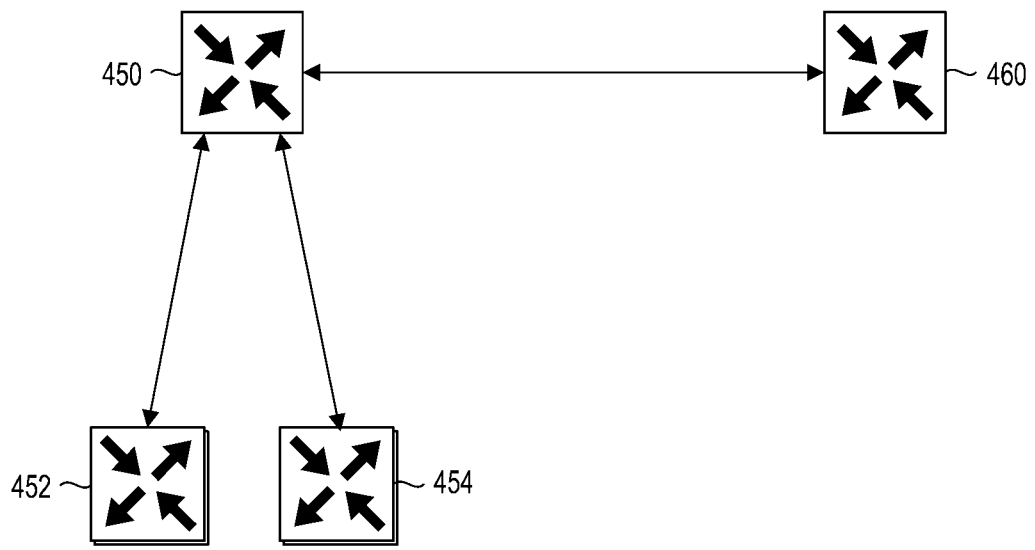
FIG. 4B is a conceptual illustration of a multi-tenant edge device 450 that uses security keys per pair-wise tunnel.

FIG. 4B is a conceptual illustration of a multi-tenant edge device 450 that uses security keys per pair-wise tunnel. In this case, security keys are generated for each tunnel between pair of edges and the number of keys maintained per device is based on the number of tunnels involving the multi-tenant edge device 450.

In this case, the multi-tenant edge device 450 is connected to a single tenant edge 452 and a single tenant edge 454. In this case, the multi-tenant edge device 450 and the single tenant edge 452 receive unique sets of keys across all overlays. For example, the single tenant edge 452 comprises M edge devices and requires M encryption keys to support M tunnels. Similarly, the single tenant edge 454 comprises N edge devices and requires N encryption keys to support N tunnels. In addition, the multi-tenant edge device 450 is also connected to a peer multi-tenant edge device 460 and presuming there are P tunnels, the multi-tenant edge device 450 also needs to support P encryption keys. In this case, the number of keys is very large and is not scalable because of key management overhead.

In a third case (not shown), an edge device may create a transport locator interface using a loopback interface per tenant. In this case, the number of loopback interfaces supported by the multi-tenant edge device may be limited and cannot support the number of interfaces required. In addition, supporting QoS on loopback interfaces is complex.

Figure 5:
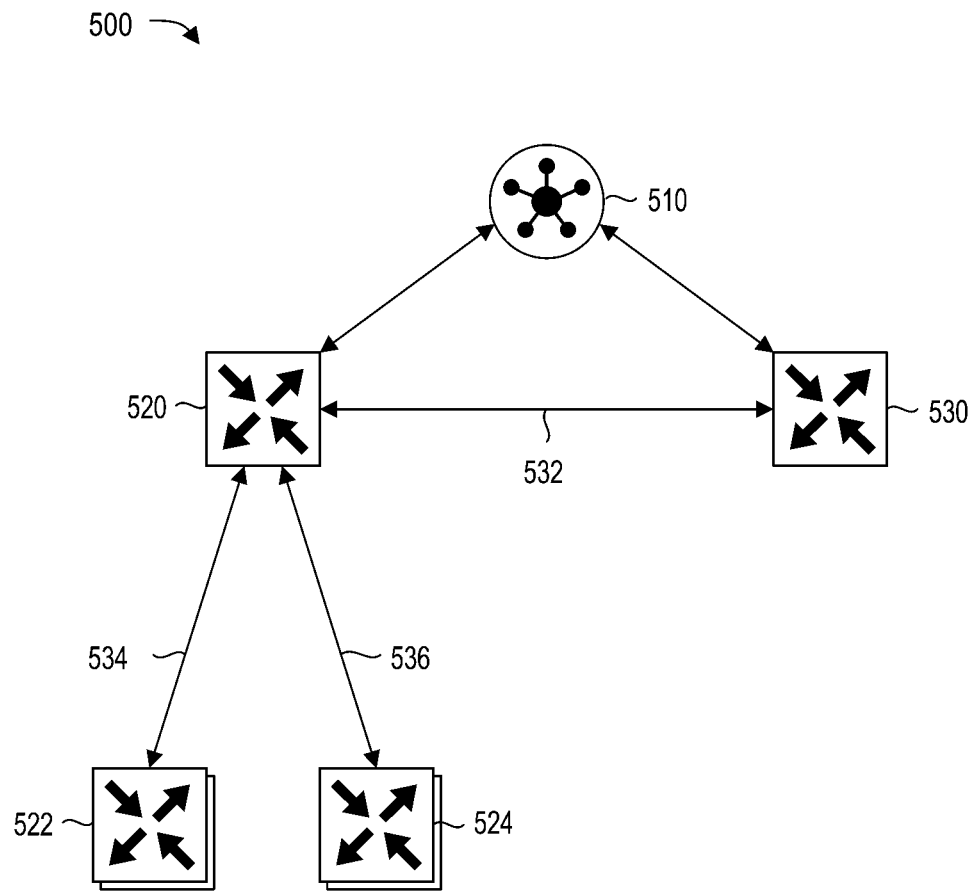
FIG. 5 illustrates a network 500 configured to advertise child encryption keys in accordance with some aspects of the disclosure.

FIG. 5 illustrates a network 500 configured to advertise child encryption keys in accordance with some aspects of the disclosure. In some aspects of the disclosure, the network 500 is configured to generate parent keys for inter-multi-tenant edge device connections and child keys for edge connections to single-tenant edge devices. In this case, parent keys are managed by the network provider, and child keys are managed by the tenants, providing separation of concerns and increasing security amongst tenants by requiring tenants to be responsible for the child keys without burdening the multi-tenant edge device with the management of all keys.

The network comprises a network controller 510, a multi-tenant edge device 520, and a multi-tenant edge device 530. The multi-tenant edge device 520 is connected to at least one edge device 522 associated with a first entity and at least one edge device 524 associated with a second entity.

In some aspects, the multi-tenant edge device 520 is configured to generate parent encryption keys for communication between multi-tenant edge devices. For example, tunnels between the multi-tenant edge device 520 and the multi-tenant edge device 530 are encrypted using a parent key 532. The parent keys are maintained by the network provider. In some cases, the network controller 510 may be configured to advertise the parent keys. In this case, the parent key 532 is a network provider asset and is managed by the network provider, and is not provided to single-tenant edge devices, such as the edge device 522 and the edge device 524.

The multi-tenant edge device 520 is also configured to generate child encryption keys per tenant and per transport interface. For example, the multi-tenant edge device 520 generates a first key 534 for the at least one edge device 522 of the first entity and a second key 536 for the edge device 524 of the second entity. In this case, the multi-tenant edge device 520 configures a unique encryption key for a tenant based on the number of transport interfaces used by the tenant. As an example, in the event the first entity separates network traffic based on different VLANs and has two different transport interfaces, and the multi-tenant edge device 520 would generate two different child encryption keys for the edge device 522.

In some aspects, the multi-tenant edge device 520 is configured to provide the parent keys and the child keys to the network controller 510 for distribution to the edge devices, such as the edge devices 522 and the edge devices 524, as further described below in FIG. 6.

In some aspects, a disclosed method generates and exchanges the per tenant keys per transport interface and requires fewer keys/interfaces as compared to the other methods described above in connection with FIGS. 4A and 4B. The disclosed method provides a separate key to each tenant and requires a number of keys based on the number of interfaces and number of tenants, as opposed to requiring keys based on the number of tunnels. For example, presuming 30 tenants and 20 tunnels, a multi-tenant edge device would manage 600 encryption keys. By contrast, the disclosed method requires one key per tenant per interface, and 30 keys would be needed presuming one interface per tenant. As a result, the multi-tenant edge device can manage the encryption keys without the additional overhead required by a large number of encryption keys.

Figure 6:
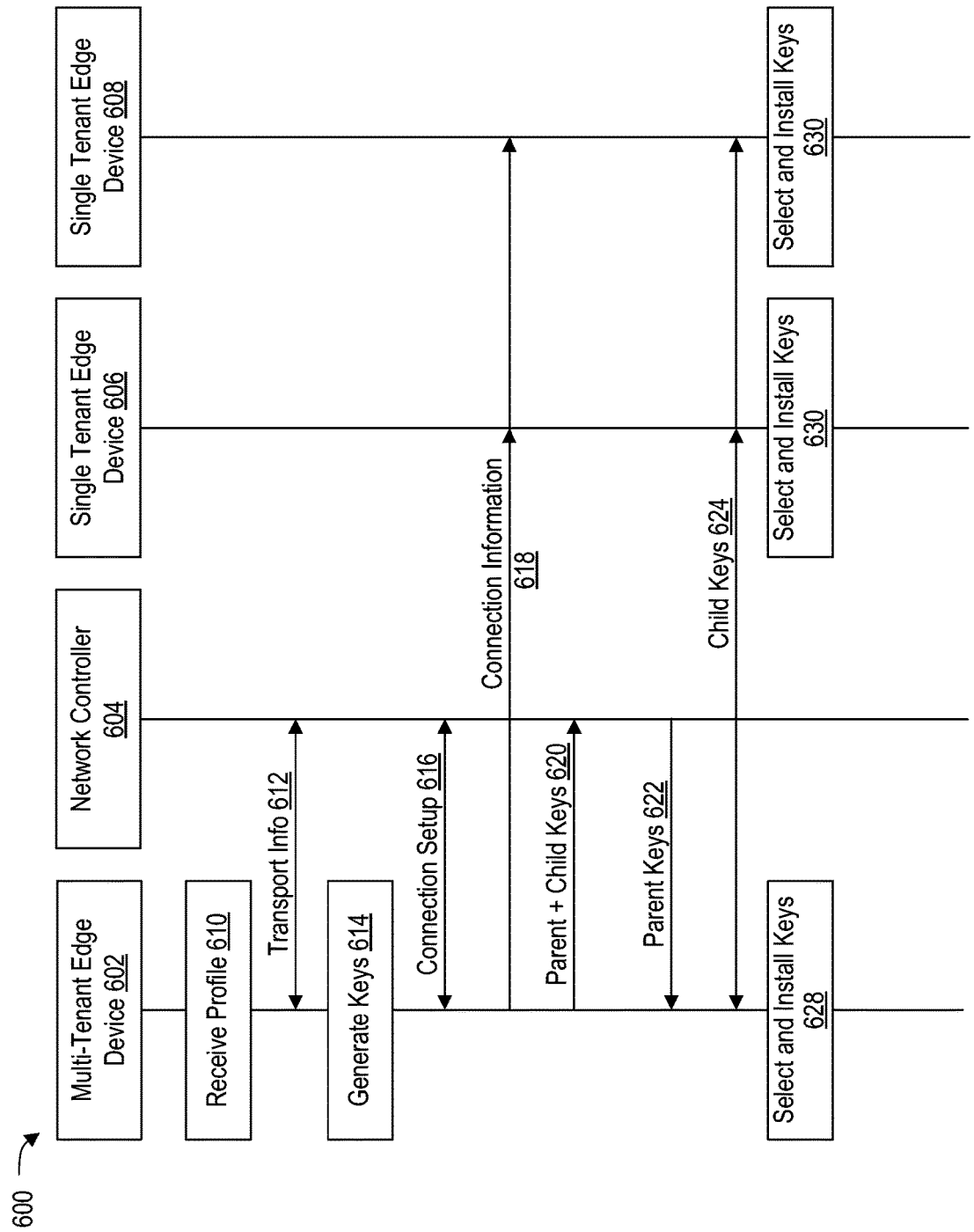
FIG. 6 is a sequence diagram 600 illustrating operation of a multi-tenant edge device with secure tunnels in accordance with some aspects of the disclosure

FIG. 6 is a sequence diagram 600 illustrating operation of a multi-tenant edge device with secure tunnels in accordance with some aspects of the disclosure. In this example, the network includes a multi-tenant edge device 602, a network controller 604 (e.g., a vSmart controller), a single-tenant edge device 606, and a single-tenant edge device 608.

In some aspects, a service provider or other entity (e.g., a network tenant) configures a tenant resource profile using a network management appliance or device (e.g., a vManage appliance). For example, using the network management appliance, the service provider or other entity provides a resource profile related to the transport interfaces allowed on multi-tenant edge device 602, and the network management appliance generates and sends the resource profile, which is received by the multi-tenant edge device 602 at block 610.

The multi-tenant edge device 602 is configured to exchange transport information 612 related to the transport interfaces with the network controller 604 using an OMP. Based on the transport information 612, the multi-tenant edge device 602 organizes the transport interfaces in parent-child relationships, with each entity including at least one interface, and generates a parent key and/or a child key based on the resource. In one example, the multi-tenant edge device 602 organizes and stores the transport interfaces based on a parent transport locator (TLOC) that corresponds to the main interface, which any additional interfaces being child TLOCs of the parent TLOC. For example, the multi-tenant edge device 602 manages the transport interfaces as tuples, which a first value corresponding to the key itself, the second value corresponding to a security parameter index (SPI), and the third value corresponding to a sequence number (i.e., <parent key, SPI, sequence number> for parent keys, and <tenant key, SPI, sequence number> for child keys.

After generating the keys, the multi-tenant edge device 602 and the network controller 604 exchange connection setup information 616 to form a per-tenant connection to the network controller 604. In this case, the network controller 604 may receive information from the multi-tenant edge device 602 to identify the edge devices and the multi-tenant edge device 602 maintains the devices and corresponding type (e.g., whether the edge device is a multi-tenant edge device or a single-tenant edge device). The multi-tenant edge device 602 then distributes connection information 618 based on the setup with the network controller 604 into the overlay network associated with the single-tenant edge device 606 and the single-tenant edge device 608. Although FIG. 6 illustrates the connection information 618 is being distributed to the single-tenant edge device 606 and the single-tenant edge device 608, this illustration is for simplicity and the distributes connection information 618 can be provided to any suitable network device. The connection information 618 does not include the encryption keys.

At block 620, the multi-tenant edge device 602 then transmits the child keys and parent keys, which were generated at block 614, to the network controller 604. In response to receiving the various keys, the network controller 604 is configured to advertise the parent keys 622 to the multi-tenant edge devices associated with the network (e.g., including the multi-tenant edge device 602). The network controller 604 is also configured to advertise the child keys 624 to each single-tenant edge device (e.g., the single-tenant edge device 606 and the single-tenant edge device 608).

In some aspects, the multi-tenant edge device 602 receives the parent keys, for example, in a transport locator, and configures the parent key for encryption between other multi-tenant edge devices based on the tunnel at block 628. For example, a parent key is configured for each transport interface of a tenant and may setup a corresponding tunnel with a multi-tenant edge device in another data center that services the same entity. The multi-tenant edge device 602 may also receive the child keys from the network controller 604. For example, the multi-tenant edge device 602 may receive the same set of keys multiple times because the multi-tenant edge device 602 may have multiple tenants onboarded and because the multi-tenant edge device 602 may also receive the keys through multiple tenant overlays. Each transport locator includes a sequence number and the multi-tenant edge device 602 selects the latest sequence number to install into the multi-tenant edge device 602.

The single-tenant edge device 606 and the single-tenant edge device 608, based on receiving the child keys, install and configure the child keys at block 630. After installing the child keys at the single-tenant edge device 606 and the single-tenant edge device 608, the single-tenant edge device 606 and the single-tenant edge device 608 each begin normal operation and communicate using the child keys.

In some cases, the tunnels may need to be rekeyed. For example, an IPSec tunnel may need to update its encryption configuration and the multi-tenant edge device 602 may be configured to generate update keys for the single-tenant edge device 606 and the single-tenant edge device 608. In this case, the multi-tenant edge device 602 generates a new parent key for each interface per tenant and a new child key for each single-tenant edge device (e.g., corresponding to block 614). In this case, the multi-tenant edge device 602 is configured to repeat connection setup and advertisement as described above in reference labels 614 to 630.

Figure 7:
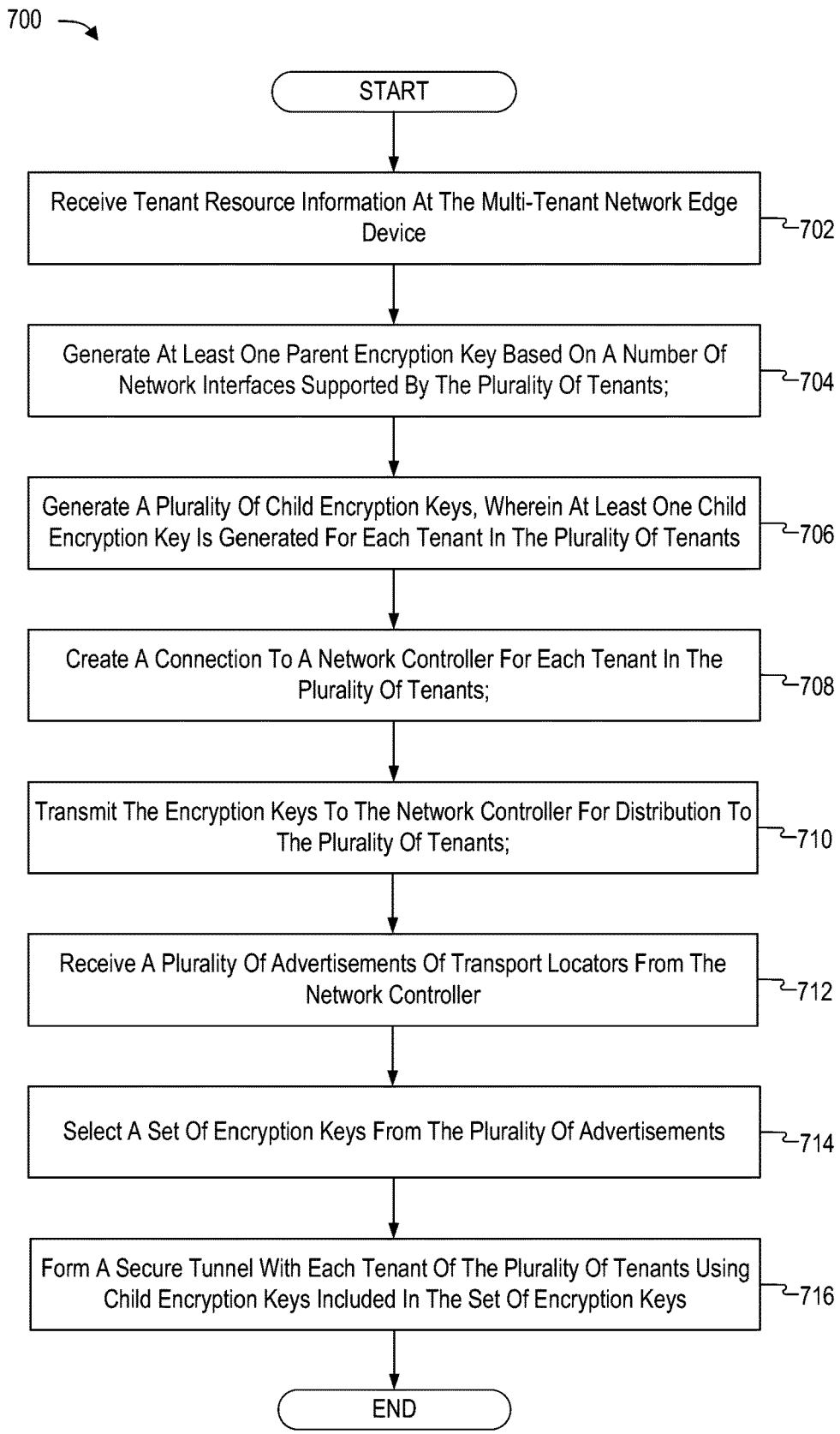
FIG. 7 illustrates an example method 700 for managing encryption keys of secure tunnels in multi-tenant edge devices in accordance with some aspects of the disclosure.

FIG. 7 illustrates an example method 700 for managing encryption keys of secure tunnels in multi-tenant edge devices in accordance with some aspects of the disclosure. In some aspects, the method is performed by a network node, such as the multi-tenant edge device 520, the multi-tenant edge device 602, etc.). For purposes of clarity, the device performing method 700 may be referred to as a computing device (e.g., the computing device 800 of FIG. 8). Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence. Although a computing device is described as performing the method, this example is for descriptive purposes. The method may be performed in a distributed manner using cloud computing, various containers, microservices, and other techniques.

At block 702, the computing system may receive tenant resource information at the multi-tenant network edge device. For example, the tenant resource information can be provided by a user of a network management device for configuring a software-defined network. In one aspect, the multi-tenant network edge device is configured to send and receive network data for a plurality of tenants. The tenant resource information includes at least one network transport interface for a first tenant. A second tenant may already be configured in the multi-tenant edge device.

At block 704, the computing system may generate at least one parent encryption key based on a number of network interfaces supported by the plurality of tenants. For example, if the tenant has 3 different VLANs with different network characteristics, three parent keys may be generated for the tenant based on three transport interfaces to the multi-tenant edge device.

At block 706, the computing system may generate a plurality of child encryption keys. In one aspect, at least one child encryption key is generated for each tenant in the plurality of tenants. In one example, the tenant may have a single interface with 20 single-tenant edge devices and the computing system may generate a single encryption key for each single-tenant edge device.

At block 708, the computing system may create a routing connection to a network controller for each tenant in the plurality of tenants. The network controller may be a network administration device, such as an SD-WAN vManage device. In some aspects, the routing connection is different from a control plane connection for managing the various devices within the network.

At block 710, the computing system may transmit the at least one parent encryption key and the plurality of child encryption keys to the network controller for distribution to the plurality of tenants At block 712, the computing system may receive a plurality of advertisements of transport locators from the network controller. In this case, each advertisement includes a parent encryption key or a child encryption key. In some cases, other devices may only receive child encryption keys, such as a single-tenant edge device (e.g., the single-tenant edge device 606 or the single-tenant edge device 608). As noted above, the set of encryption keys is based on the number of tenants and the number of network interfaces. Each transport locator in the plurality of advertisements includes a key type, a security parameter index, and a sequence number.

In some aspects, the network controller is configured to advertise the at least one parent encryption key to the multi-tenant network edge device and advertise the plurality of child encryption keys to the plurality of tenants. As noted above, the multi-tenant edge device provides the encryption keys to the network controller and the network controller corresponding distributes them in a consistent manner and allows single-tenant edge devices to be configured with minimal overhead as compared to the previous techniques described with reference to FIG. 4.

At block 714, the computing system may select a set of encryption keys from the plurality of advertisements. For example, as noted above, the multi-tenant edge device may receive the same set of keys at different times with different sequence numbers. In one aspect, the set of encryption keys is selected based on the largest sequence number for the first tenant in the event multiple encryption keys for the first tenant are received.

At block 716, the computing system may form a secure tunnel with each tenant of the plurality of tenants using child encryption keys included in the set of encryption keys. In this case, after installing the keys, each tenant is configured to interface with the multi-tenant network edge device using a different encryption key for each interface.

In some aspects, the computing system may configure a secure tunnel with another multi-tenant network edge device based on a parent encryption key and a key received from the another multi-tenant network edge device. For example, if the entity has tenants at another network infrastructure node (e.g., at another data center), the multi-tenant edge device may form a secure channel based on the parent key. In this case, the parent keys are managed by the network operator, and the child keys are managed by the tenants.

Figure 8:
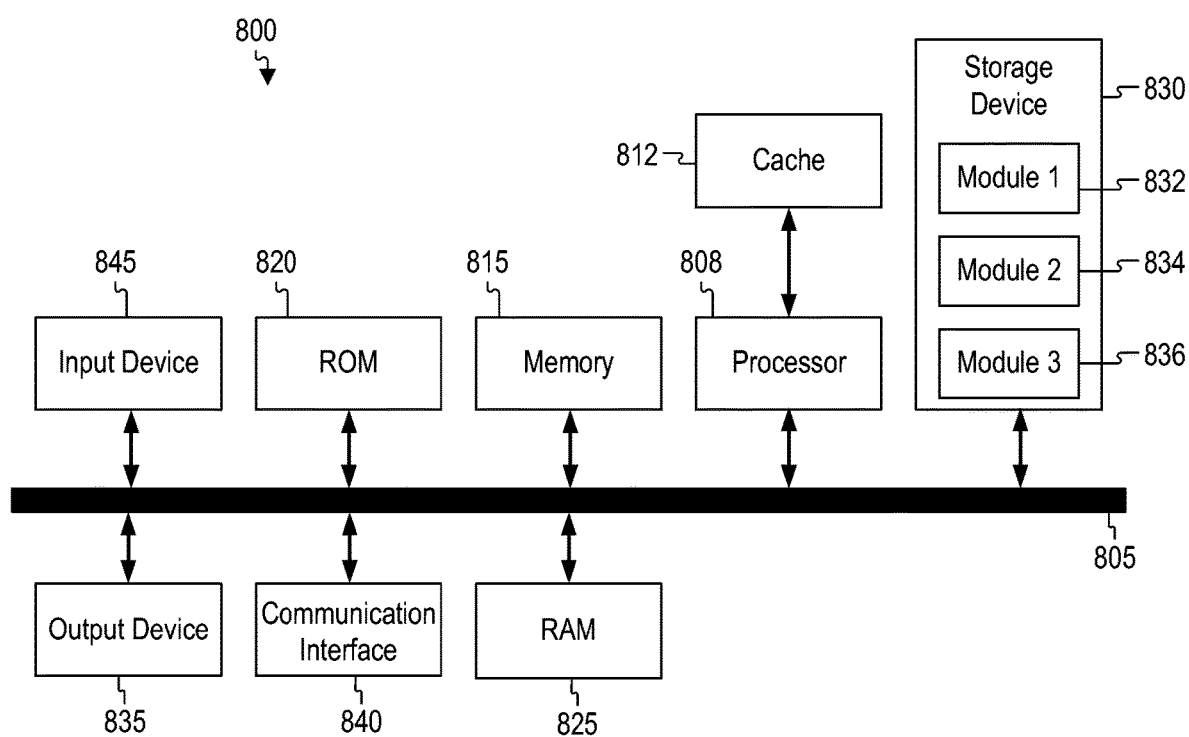
FIG. 8 shows an example of a system for implementing certain aspects of the present technology.

FIG. 8 shows an example of computing system 800, which can be, for example any computing device making up the multi-tenant edge device 400, the single tenant edge 452, the network controller 510, the multi-tenant edge device 520, the edge device 522, the edge device 524, and other devices described herein, or any component thereof in which the components of the system are in communication with each other using connection 805. Connection 805 can be a physical connection via a bus, or a direct connection to processor 808, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 808 and connection 805 that couples various system components including system memory 815, such as read-only memory (ROM) 820 and random access memory (RAM) 825 to processor 808. Computing system 800 can include a cache of high-speed memory 812 connected directly with, in close proximity to, or integrated as part of processor 808.

Processor 808 can include any general purpose processor and a hardware service or software service, such as services 832, 834, and 836 stored in storage device 830, configured to control processor 808 as well as a special-purpose processor where software instructions are incorporated into the actual processor design. Processor 808 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 808, it causes the system to perform a function. In some embodiments, a hardware service that performs a particular function can include the software component stored in a computer-readable medium in connection with the necessary hardware components, such as processor 808, connection 805, output device 835, etc., to carry out the function.

Figure 9:
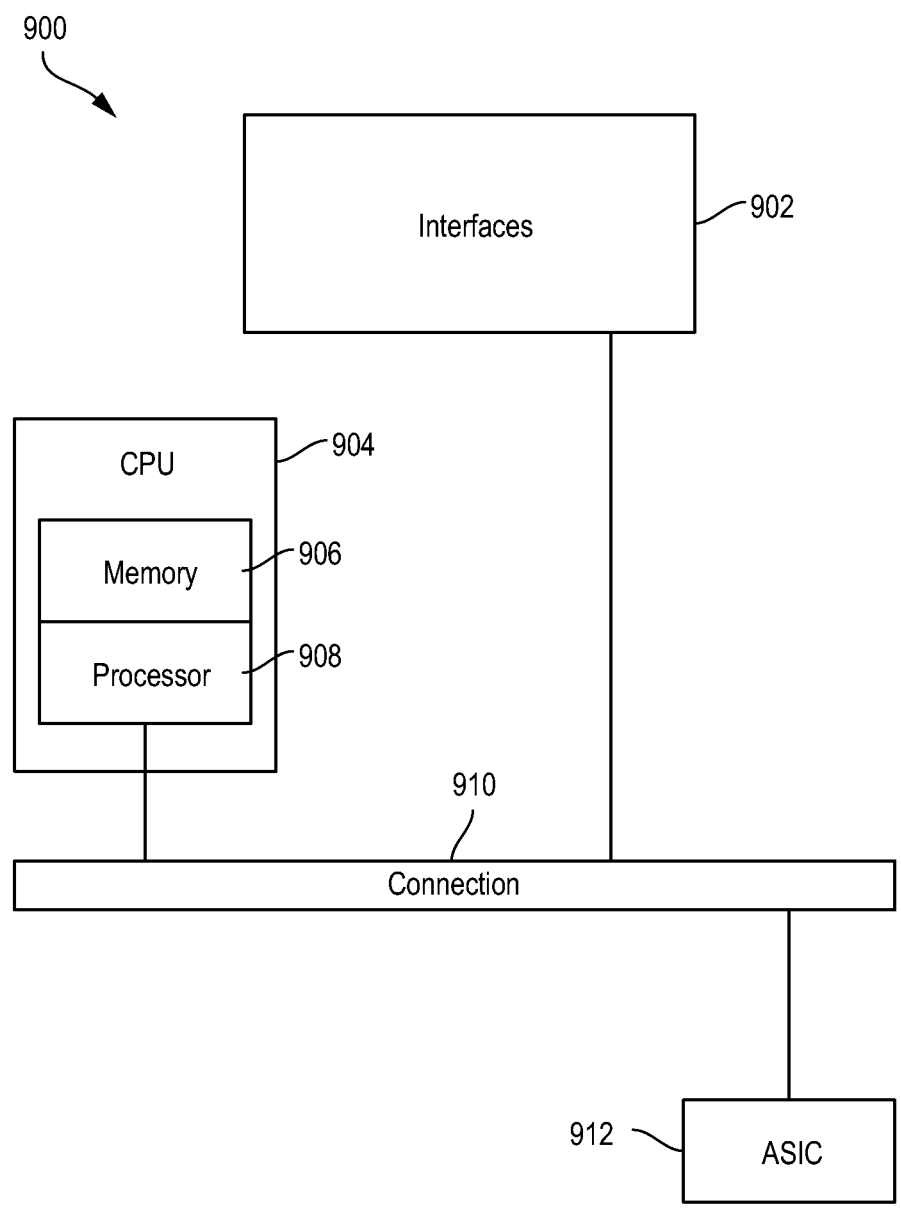
FIG. 9 illustrates an example network device in accordance with some examples of the disclosure.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., the CPU 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a client device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per sc.

Methods according to the above-described examples may be implemented using computer-executable instructions that are stored or otherwise available from computer readable media. Such instructions may comprise, for example, instructions and data which cause or otherwise configure a general-purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smartphones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

What is claimed is:

1. A method for managing encryption keys in a multi-tenant network edge device, the method comprising:
   receiving tenant resource information at the multi-tenant network edge device, wherein the multi-tenant network edge device is configured to send and receive network data for a plurality of tenants, and wherein the tenant resource information includes at least one network transport interface for a first tenant;

generating at least one parent encryption key based on a number of network interfaces supported by the plurality of tenants;

generating a plurality of child encryption keys, wherein at least one child encryption key is generated for each tenant in the plurality of tenants;

creating a routing connection to a network controller for each tenant in the plurality of tenants;

transmitting the at least one parent encryption key and the plurality of child encryption keys to the network controller for distribution to the plurality of tenants;

receiving a plurality of advertisements of transport locators from the network controller, wherein each advertisement includes a parent encryption key or a child encryption key;

selecting a set of encryption keys from the plurality of advertisements; and forming a secure tunnel with each tenant of the plurality of tenants using child encryption keys included in the set of encryption keys.

2. The method of claim 1, wherein the set of encryption keys is based on the number of tenants and the number of network interfaces.

3. The method of claim 1, further comprising:
configuring a secure tunnel with another multi-tenant network edge device based on a parent encryption key and a key received from the another multi-tenant network edge device.

4. The method of claim 1, wherein each transport locator in the plurality of advertisements includes a key type, a security parameter index, and a sequence number.

5. The method of claim 4, wherein the set of encryption keys is selected based on a largest sequence number for the first tenant in the event multiple encryption keys for the first tenant are received.

6. The method of claim 1, wherein each tenant is configured to interface with the multi-tenant network edge device using a different encryption key for each interface.

7. The method of claim 6, wherein the network controller is configured to advertise the at least one parent encryption key to the multi-tenant network edge device and advertise the plurality of child encryption keys to the plurality of tenants.

8. A multi-tenant network edge device for managing encryption keys, comprising:
a storage configured to store instructions; and
a processor configured to execute the instructions and cause the processor to:
receive tenant resource information at the multi-tenant network edge device, wherein the multi-tenant network edge device is configured to send and receive network data for a plurality of tenants, and wherein the tenant resource information includes at least one network transport interface for a first tenant;
generate at least one parent encryption key based on a number of network interfaces supported by the plurality of tenants;
generate a plurality of child encryption keys, wherein at least one child encryption key is generated for each tenant in the plurality of tenants;
create a routing connection to a network controller for each tenant in the plurality of tenants;
transmit the at least one parent encryption key and the plurality of child encryption keys to the network controller for distribution to the plurality of tenants;
receive a plurality of advertisements of transport locators from the network controller, wherein each advertisement includes a parent encryption key or a child encryption key;
select a set of encryption keys from the plurality of advertisements; and
form a secure tunnel with each tenant of the plurality of tenants using child encryption keys included in the set of encryption keys.

9. The multi-tenant network edge device of claim 8, wherein the set of encryption keys is based on the number of tenants and the number of network interfaces.

10. The multi-tenant network edge device of claim 8, wherein the processor is configured to execute the instructions and cause the processor to: configure a secure tunnel with another multi-tenant network edge device based on a parent encryption key and a key received from the another multi-tenant network edge device.

11. The multi-tenant network edge device of claim 8, wherein each transport locator in the plurality of advertisements includes a key type, a security parameter index, and a sequence number.

12. The multi-tenant network edge device of claim 11, wherein the set of encryption keys is selected based on a largest sequence number for the first tenant in the event multiple encryption keys for the first tenant are received.

13. The multi-tenant network edge device of claim 8, wherein each tenant is configured to interface with the multi-tenant network edge device using a different encryption key for each interface.

14. The multi-tenant network edge device of claim 12, wherein the network controller is configured to advertise the at least one parent encryption key to the multi-tenant network edge device and advertise the plurality of child encryption keys to the plurality of tenants.

15. A non-transitory computer readable medium comprising instructions, the instructions, when executed by a computing system, cause the computing system to:
receive tenant resource information at a multi-tenant network edge device, wherein the multi-tenant network edge device is configured to send and receive network data for a plurality of tenants, and wherein the tenant resource information includes at least one network transport interface for a first tenant;
generate at least one parent encryption key based on a number of network interfaces supported by the plurality of tenants;
generate a plurality of child encryption keys, wherein at least one child encryption key is generated for each tenant in the plurality of tenants;
create a routing connection to a network controller for each tenant in the plurality of tenants;
transmit the at least one parent encryption key and the plurality of child encryption keys to the network controller for distribution to the plurality of tenants;
receive a plurality of advertisements of transport locators from the network controller, wherein each advertisement includes a parent encryption key or a child encryption key;
select a set of encryption keys from the plurality of advertisements; and
form a secure tunnel with each tenant of the plurality of tenants using child encryption keys included in the set of encryption keys.

16. The computer readable medium of claim 15, wherein the set of encryption keys is based on the number of tenants and the number of network interfaces.

17. The computer readable medium of claim 15, wherein the computer readable medium further comprises instructions that, when executed by the computing system, cause the computing system to: configure a secure tunnel with another multi-tenant network edge device based on a parent encryption key and a key received from the another multi-tenant network edge device.

18. The computer readable medium of claim 15, each transport locator in the plurality of advertisements includes a key type, a security parameter index, and a sequence number.

19. The computer readable medium of claim 15, wherein each tenant is configured to interface with the multi-tenant network edge device using a different encryption key for each interface.

20. The computer readable medium of claim 19, wherein the network controller is configured to advertise the at least one parent encryption key to the multi-tenant network edge device and advertise the plurality of child encryption keys to the plurality of tenants.

* * * * *